US012034155B1

United States Patent
Xiao et al.

(10) Patent No.: US 12,034,155 B1
(45) Date of Patent: Jul. 9, 2024

(54) SECONDARY BATTERY AND ELECTRICAL DEVICE

(71) Applicant: CONTEMPORARY AMPEREX TECHNOLOGY CO., LIMITED, Ningde (CN)

(72) Inventors: Dejun Xiao, Ningde (CN); Jiahua Chen, Ningde (CN); Qian Liu, Ningde (CN); Quanguo Li, Ningde (CN); Jingxuan Sun, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/426,295

(22) Filed: Jan. 29, 2024

Related U.S. Application Data

(63) Continuation of application No. PCT/CN2022/125551, filed on Oct. 17, 2022.

(51) Int. Cl.
*H01M 4/36* (2006.01)
*H01M 4/62* (2006.01)
*H01M 10/28* (2006.01)
*H01M 4/02* (2006.01)

(52) U.S. Cl.
CPC ........... *H01M 4/366* (2013.01); *H01M 4/623* (2013.01); *H01M 4/625* (2013.01); *H01M 10/286* (2013.01); *H01M 2004/021* (2013.01); *H01M 2220/20* (2013.01)

(58) Field of Classification Search
None
See application file for complete search history.

(56) References Cited

U.S. PATENT DOCUMENTS

| 2016/0164135 A1* | 6/2016 | Fasching | H01M 4/62 429/231.95 |
| 2019/0189991 A1* | 6/2019 | Arise | H01M 4/583 |

FOREIGN PATENT DOCUMENTS

| CN | 110197889 A | 9/2019 |
| CN | 111384374 A | 7/2020 |
| CN | 108807974 B | 7/2021 |
| CN | 114303257 A | 4/2022 |

(Continued)

OTHER PUBLICATIONS

International Search Report received in the corresponding international application PCT/CN2022/125551, mailed Mar. 15, 2023.

(Continued)

*Primary Examiner* — Wyatt P McConnell
(74) *Attorney, Agent, or Firm* — Kilpatrick Townsend & Stockton LLP

(57) ABSTRACT

The present application relates to a secondary battery, which includes: a cathode sheet, an anode sheet, and an electrolyte; the cathode sheet includes a cathode film layer containing a cathode active material, and the anode sheet includes an anode film layer containing an anode active material; and the secondary battery meets a following function relationship: $0.22 \leq 3 \times (A1/A2) \times (B2-B1)/(B1+B2) \leq 1.55$, the parameters are referred to the description; and an electrical device including the secondary battery. The secondary battery in the present application has both good cycle life and excellent fast charging capacity.

13 Claims, 1 Drawing Sheet

(56) References Cited

FOREIGN PATENT DOCUMENTS

| | | |
|---|---|---|
| CN | 114914547 A | 8/2022 |
| JP | 2012129070 A | 7/2012 |
| JP | 2017068939 A | 4/2017 |

OTHER PUBLICATIONS

Written Opinion of ISA received in the corresponding international application PCT/CN2022/125551, mailed Mar. 15, 2023.

* cited by examiner

SECONDARY BATTERY AND ELECTRICAL DEVICE

CROSS REFERENCE TO RELATED APPLICATION

The present application is a continuation of International Patent Application No. PCT/CN2022/125551, filed on Oct. 17, 2022, the contents of which are incorporated herein by reference.

TECHNICAL FIELD

The present application relates to the technical field of secondary batteries, and more particularly to a secondary battery and an electrical device.

BACKGROUND

With the rapid development of the lithium-ion battery technology, lithium-ion batteries are more and more widely used in portable/mobile electronic devices, electric vehicles, energy storage power stations. However, due to the current scarcity and uneven distribution of lithium sources, the high price of lithium-related raw materials, and the cost of lithium-ion batteries limits its further large-scale use. Sodium-ion battery has huge market potential because of its wide source of raw materials and low cost of raw materials.

The advantages of sodium-ion batteries are fast charging ability and good low temperature ability. However, the anode material of sodium ion battery used at present is usually amorphous carbon, which is easy to produce gas with electrolyte under low pressure due to the characteristics of many functional groups on its surface. In addition, currently commonly used cathode materials such as oxides are prone to oxidize and produce gas under high pressure, which makes the internal pressure of sodium ion cells rise rapidly, worsening the cycle life and causing serious safety risks. Therefore, the development of sodium-ion batteries with excellent cycle life and good fast charging ability is the key to their current application.

SUMMARY

The present application is proposed based on the above problem and aims to provide a secondary battery with a specific relationship between the particle size $D_{n10}$ of micro-powder number of cathode and anode active material and the porosity of the cathode and anode film layers, so that the secondary battery in the present application has both good cycle life and excellent fast charging capacity.

In order to achieve above object, the present application provides a secondary battery and an electrical device.

A first aspect of the present application provides a secondary battery, which includes a cathode sheet, an anode sheet, and an electrolyte; the cathode sheet includes a cathode film layer containing a cathode active material; the anode sheet includes an anode film layer containing an anode active material; and the secondary battery meets a following function relationship:

$$0.22 \leq 3 \times (A1/A2) \times (B2-B1)/(B1+B2) \leq 1.55;$$

where A1 is a particle size $D_{n10}$ of the cathode active material corresponding to that a cumulative percentage of a particle number sequentially counted from a small particle in the cathode active material reaches 10% of a total particle number, in m;

A2 is a particle size $D_{n10}$ corresponding to that a cumulative percentage of a particle number sequentially counted from a small particle in the anode active material reaches 10% of the total particle number, in m;

B1 is a porosity of the cathode film layer; and

B2 is a porosity of the anode film layer

In the secondary battery of the present application, by a specific relationship between the particle size $D_{n10}$ of the micro-powder number of cathode and anode active material and the porosity of the cathode and anode film layers, such that the insertion and removal of ions on the cathode and anodes are matched with each other, therefore ensuring that the secondary battery has both good cycle life and excellent fast charging ability.

The particle size in the present application is determined by referring to GB/T19077.1-2009 particle size distribution laser diffraction method.

In any embodiments, 0.25 µm≤A1≤1.2 µm, and 0.4 µm≤A2≤3.0 µm. The specific particle size of micro-powder can help improve the drawability performance of the electrode sheet during the processing process, thereby ensuring that the secondary battery has both good cycle life and excellent fast charging ability.

In any embodiments, 10%≤B2−B1≤40%. Therefore, it is possible to avoid the accumulation of ions at the cathode and anode, thereby ensuring that the secondary battery has both good cycle life and excellent fast charging ability.

In any embodiments, an average volume particle size $D_{v50}$ of the cathode active material is ranged from 4.2 µm to 9.7 µm. Therefore, it contributes to improve the drawability performance of the cathode sheet during the processing process, thereby ensuring that the secondary battery has both good cycle life and excellent fast charging ability.

In any embodiments, an average volume particle size $D_{v50}$ of the anode active material is ranged from 3.4 µm to 9.6 µm. Therefore, it contributes to improve the drawability performance of the anode sheet during the processing process, thereby ensuring that the secondary battery has both good cycle life and excellent fast charging ability.

In any embodiments, the cathode active material meets at least one of following characteristics:

$D_{v10}$ is ranged from 2.2 µm to 4.9 µm; and $D_{v90}$ is ranged from 8.2 µm to 21.9 µm. Therefore, it contributes to improve the drawability performance of the cathode sheet during the processing process, thereby ensuring that the secondary battery has both good cycle life and excellent fast charging ability.

In any embodiments, the anode active material meets at least one of following characteristics:

$D_{v10}$ is ranged from 1.9 µm to 3.4 µm; and $D_{v90}$ is ranged from 7.9 µm to 17.5 µm. $D_{v10}$ represents the particle size corresponding to 10% in the volume distribution, and $D_{v10}$ is 1.9 µm, indicating that 10% of the volume distribution corresponds to the particle size is 1.9 µm; and $D_{v190}$ represents the particle size corresponding to 90% in the volume distribution, and $D_{v90}$ is 7.9 µm, indicating that 90% of the volume distribution corresponds to the particle size is 7.9 µm. Therefore, it contributes to improve the drawability performance of the anode sheet during the processing process, thereby ensuring that the secondary battery has both good cycle life and excellent fast charging ability.

In any embodiments, a compaction density of the cathode film layer is arranged from 2.3 g/cm³ to 3.2 g/cm³, and a thickness of the cathode film is arranged from 60 µm to 110 µm. Therefore, it contributes to improve the drawability performance of the cathode sheet during the processing process, thereby ensuring that the secondary battery has both good cycle life and excellent fast charging ability.

In any embodiments, a compaction density of the anode film layer is arranged from 0.9 g/cm$^3$ to 1.2 g/cm$^3$, and a thickness of the anode film layer is arranged from 50 μm to 140 μm.

Therefore, it contributes to improve the drawability performance of the anode sheet during the processing process, thereby ensuring that the secondary battery has both good cycle life and excellent fast charging ability.

In any embodiments, the cathode film layer includes the cathode active material of 90-97%, a conductive agent of 0.8-2.0%, and a binder of 1.5-2.7%, based on a weight of the cathode film layer. Therefore, it contributes to improve the drawability performance of the cathode sheet during the processing process, thereby ensuring that the secondary battery has both good cycle life and excellent fast charging ability.

In any embodiments, the anode film layer comprises the anode active material of 91.6-97.5%, a conductive agent of 0-1.74%, and a binder of 0-6.56%, based on a weight of the anode film layer. Therefore, it contributes to improve the drawability performance of the anode sheet during the processing process, thereby ensuring that the secondary battery has both good cycle life and excellent fast charging ability.

In any embodiments, the secondary battery is a sodium-ion secondary battery. Therefore, ensuring that the secondary battery has both good cycle life and excellent fast charging ability.

In a second aspect of the present application further provides an electrical device, which includes the secondary battery as described in the first aspect.

In the secondary battery of the present application, by a specific relationship between the particle size $D_{n10}$ of the micro-powder number of cathode and anode active material and the porosity of the cathode and anode film layers, such that the insertion and removal of ions on the cathode and anodes are matched with each other, therefore ensuring that the secondary battery has both good cycle life and excellent fast charging ability.

Figure 1:
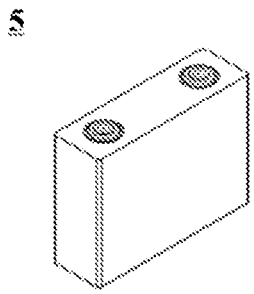
FIG. 1 is a schematic view of a secondary battery in an embodiment of the present application.

In the drawings, the reference numerals are as follows:
5—secondary battery; 51—shell; 52—electrode assembly; 53—cover plate; 6—electrical device.

DETAILED DESCRIPTION OF EMBODIMENTS

The following, with appropriate reference to the attached drawings, details the embodiment of the secondary battery and electrical device specified in the present application. However, there are cases where unnecessary details are omitted. There are instances, for example, of omitting detailed descriptions of matters that are already well known, of repeating descriptions of virtually the same structure. This is to avoid the following instructions becoming unnecessarily lengthy and to facilitate the understanding of those skilled in the art. In addition, the drawings and the following instructions are provided for the full understanding of the present application by those skilled in the art and are not intended to limit the subject matter described in the claims.

The "range" disclosed in the present application is defined in the form of a lower limit and an upper limit, and the given range is defined by the selection of a lower limit and an upper limit, which define the boundaries of the particular range. The range qualified in this way can include or exclude end values, and can be arbitrarily combined, that is, any lower limit can be combined with any upper limit to form a range. For example, if the ranges 60-120 and 80-110 are listed for a particular parameter, it is understood that the ranges 60-110 and 80-120 are also expected. In addition, if the minimum range values 1 and 2 are listed, and the maximum range values 3, 4 and 5 are listed, the following ranges can all be expected: ranges of 1-3, 1-4, 1-5, 2-3, 2-4, and 2-5. In the present application, unless otherwise stated, the numerical range "a-b" represents an abbreviated representation of any combination of real numbers between a and b, where both a and b are real numbers. For example, the value range "0-5" indicates that all real numbers between "0 to 5" have been listed in this article, and "0-5" is only an abbreviated representation of the combination of these values. In addition, when a parameter is expressed as an integer ≥2, it is equivalent to exposing the parameter as, for example, the integers 2, 3, 4, 5, 6, 7, 8, 9, 10, 11, 12, etc.

Unless otherwise specified, all embodiments of the present application and optional embodiments can be combined to form new technical solutions.

Unless otherwise specified, all technical features of the present application and optional technical features can be combined to form a new technical solution.

Unless otherwise specified, all steps of the present application may be carried out sequentially or randomly, preferably carried out sequentially. For example, the method includes steps (a) and (b), indicating that the method may include sequential steps (a) and (b) or sequential steps (b) and (a). For example, the reference to the method may also include step (c), indicating that steps (c) may be added to the method in any order, for example, the method may include steps (a), (b) and (c), or steps (a), (c) and (b), or steps (c), (a) and (b).

References to "including" and "containing" in the present application mean open, or closed, unless otherwise specified. For example, the words "include" and "contain" may indicate that other components not listed may also be included or contained, or only the listed components may be included or contained.

In the present application, the term "or" is inclusive unless otherwise specified. For example, the phrase "A or B" means "A along, B along, or both A and B." More specifically, either of the following conditions "A or B" are satisfied: A is true (or exists) and B is false (or does not exist); A is false (or does not exist) and B is true (or exists); or both A and B are true (or exist).

The advantages of sodium-ion batteries are fast charging ability and good low temperature ability. However, the anode material of sodium ion battery used at present is usually amorphous carbon, which is easy to produce gas with electrolyte under low pressure due to the characteristics of many functional groups on its surface. In addition, currently commonly used cathode materials such as oxides are prone to oxidize and produce gas under high pressure, which makes the internal pressure of sodium ion cells rise rapidly, worsening the cycle life and causing serious safety risks. Therefore, the development of sodium-ion batteries with excellent cycle life and good fast charging ability is the key to their current application. The inventor found that the secondary battery in the first aspect of the present application has a specific relationship between the particle size $D_{n10}$ of the micro-powder number of cathode and anode active material and the porosity of the cathode and anode film layers, and there is a specific amount of micro-powder in the cathode and anodes, which helps to fill the internal pores of the electrode sheets, to improve the compaction density of the electrode sheets, and thus increase the energy density of the electrode sheets. Therefore, the specific relationship with the porosity of the electrode sheets can be ensured, which contributes to alleviate the concentration polarization of the liquid phase, and the energy density of the pole plate will not be too much sacrificed; thus secondary battery of the present application has both good cycle life and excellent fast charging ability through the synergistic action of the parameters of the cathode and anode sheets.

Secondary Battery

In some embodiments, the first aspect of the present application provides a secondary battery, and the secondary battery includes a cathode sheet an anode sheet, and an electrolyte; the cathode sheet includes a cathode film layer containing a cathode active material; the anode sheet includes an anode film layer containing an anode active material; and the secondary battery meets a following function relationship:

$$0.22 \leq 3 \times (A1/A2) \times (B2-B1)/(B1+B2) \leq 1.55;$$

Optionally, $0.25 \leq 3 \times (A1/A2) \times (B2-B1)/(B1+B2) \leq 1.38$;

Further optionally, $0.5 \leq 3 \times (A1/A2) \times (B2-B1)/(B1+B2) \leq 1.00$;

Furthermore optionally, $0.75 \leq 3 \times (A1/A2) \times (B2-B1)/(B1+B2) \leq 1.00$;

where, A1 is a particle size $D_{n10}$ of the cathode active material corresponding to that a cumulative percentage of a particle number sequentially counted from a small particle in the cathode active material reaches 10% of a total particle number, in m;

A2 is a particle size $D_{n10}$ of the anode active material corresponding to that a cumulative percentage of a particle number sequentially counted from a small particle in the anode active material reaches 10% of the total particle number, in m;

B1 is a porosity of the cathode film layer;

B2 is a porosity of the anode film layer.

The secondary battery of the present application has a specific relationship between the particle size $D_{n10}$ of the micro-powder number of cathode and anode active material and the porosity of the cathode and anode film layers, and ensuring that there is a specific amount of micro-powder in the cathode and anodes, which helps to fill the internal pores of the electrode sheets, to improve the compaction density of the electrode sheets, and thus increase the energy density of the electrode sheets. Therefore, the specific relationship with the porosity of the electrode sheets can be ensured, which contributes to alleviate the concentration polarization of the liquid phase, and the energy density of the pole plate will not be too much sacrificed; thus secondary battery of the present application has both good cycle life and excellent fast charging ability through the synergistic action of the parameters of the cathode and anode sheets.

In some embodiments, $0.25~\mu m \leq A1 \leq 1.2~\mu m$, $0.4~\mu m \leq A1 \leq 0.8~\mu m$, and further optionally, $0.6~\mu m \leq A1 \leq 0.8~\mu m$; $0.4~\mu m \leq A2 \leq 3.0~\mu m$, optionally $0.5~\mu m \leq A2 \leq 2.6~\mu m$, and further optionally, $0.5~\mu m \leq A2 \leq 0.8~\mu m$. The specific particle size of micro-powder can help improve the drawability performance of the electrode sheet during the processing process, thereby ensuring that the secondary battery has both good cycle life and excellent fast charging ability.

In some embodiments, $10\% \leq 1B2-B1 \leq 40\%$. Therefore, it is possible to avoid the accumulation of ions at the cathode and anode, thereby ensuring that the secondary battery has both good cycle life and excellent fast charging ability.

In some embodiments, $10\% \leq 1B1 35\%$, $30\% \leq B2 \leq 60\%$, optionally, $25\% \leq B1 \leq 35\%$, and $50\% B2 \leq 60\%$.

In some embodiments, an average volume particle size $D_{v50}$ of the cathode active material is ranged from 4.2 μm to 9.7 μm, optionally ranged from 4.5 μm to 7.6 μm. Therefore, it contributes to improve the drawability performance of the cathode sheet during the processing process, thereby ensuring that the secondary battery has both good cycle life and excellent fast charging ability.

In some embodiments, an average volume particle size $D_{v50}$ of the anode active material is ranged from 3.4 μm to 9.6 μm, optionally 4.8 μm to 7.9 μm. Therefore, it contributes to improve the drawability performance of the anode sheet during the processing process, thereby ensuring that the secondary battery has both good cycle life and excellent fast charging ability.

In some embodiments, the cathode active material meets at least one of the following characteristics:

$D_{v10}$ is ranged from 2.2 μm to 4.9 μm, optionally ranged from 2.4 μm to 3.7 μm $D_{v90}$ is ranged from 8.2 μm to 21.9 μm, optionally ranged from 8.5 μm to 17.3 μm. Therefore, it contributes to improve the drawability performance of the cathode sheet during the processing process, thereby ensuring that the secondary battery has both good cycle life and excellent fast charging ability.

In some embodiments, the anode active material meets at least one of the following characteristics:

$D_{v10}$ is ranged from 1.9 μm to 3.4 μm, optionally ranged from 2.5 μm to 3.1 μm; and $D_{v90}$ is ranged from 7.9 μm to 17.5 μm, optionally ranged from 9.1 μm to 16.7 μm. $D_{v10}$ represents the particle size corresponding to 10% in the volume distribution, and $D_{v10}$ is 1.9 μm, indicating that 10% of the volume distribution corresponds to the particle size is 1.9 μm; and $D_{v190}$ represents the particle size corresponding to 90% in the volume distribution, and $D_{v90}$ is 7.9 μm, indicating that 90% of the volume distribution corresponds to the particle size is 7.9 μm. Therefore, it contributes to improve the drawability performance of the anode sheet during the processing process, thereby ensuring that the secondary battery has both good cycle life and excellent fast charging ability.

In some embodiments, a compaction density of the cathode film layer is arranged from 2.3 g/cm³ to 3.2 g/cm³, optionally arranged from 2.8-3.0 g/cm³; and a thickness of the cathode film is arranged from 60 μm to 110 μm, optionally arranged from 75 μm to 95 μm. Therefore, it contributes to improve the drawability performance of the cathode sheet during the processing process, thereby ensuring that the secondary battery has both good cycle life and excellent fast charging ability.

In some embodiments, a compaction density of the anode film layer is arranged from 0.9 g/cm³ to 1.2 g/cm³, optionally arranged from 0.94 g/cm³ to 1.05 g/cm³; and a thickness of the anode film layer is arranged from 50 μm to 140 μm, optionally arranged from 70 μm to 110 μm. Therefore, it contributes to improve the drawability performance of the anode sheet during the processing process, thereby ensuring that the secondary battery has both good cycle life and excellent fast charging ability.

In some embodiments, the cathode film layer includes the cathode active material of 90-97%, a conductive agent of 0.8-2.0%, and a binder of 1.5-2.7%, based on a weight of the cathode film layer. Therefore, it contributes to improve the drawability performance of the cathode sheet during the processing process, thereby ensuring that the secondary battery has both good cycle life and excellent fast charging ability.

In some embodiments, the anode film layer comprises the anode active material of 91.6-97.5%, a conductive agent of 0-1.74%, and a binder of 0-6.56%, based on a weight of the anode film layer. Therefore, it contributes to improve the drawability performance of the anode sheet during the processing process, thereby ensuring that the secondary battery has both good cycle life and excellent fast charging ability.

In some embodiments, the secondary battery is a sodium-ion secondary battery. Thus, the applied secondary battery is guaranteed to have both good cycle life and excellent fast charging ability.

The second aspect of the present application also provides an electrical device including the secondary battery as described in the first aspect of the present application.

The secondary batteries and electrical devices for the present application are described below with appropriate reference to the attached drawings.

In one embodiment of the present application, a secondary battery is provided.

Generally, a secondary battery includes a cathode sheet, an anode sheet, an electrolyte, and an isolation film. In the process of battery charging and discharging, active ions are inserted and removed between the cathode and anode sheets. The electrolyte is acted to conduct ions between the cathode sheet and the anode sheet. The isolation film is arranged between the cathode sheet and the anode sheet, which mainly prevents the short circuit of the cathode sheet and the anode sheet, and allows ions to pass through the isolation film.

Cathode Sheet

A cathode sheet is the cathode sheet as described in the first aspect of the present application.

The cathode sheet includes a cathode current collector fluid and a cathode film layer arranged on at least one surface of the cathode current collector, and the cathode film layer has the technical characteristics described in the first aspect of the present application.

As an example, the cathode current collector has two surfaces opposite each other in the direction of its own thickness, and the cathode film layer is arranged on either or both of the two surfaces of the cathode current collector.

In some embodiments, the cathode current collector can adopt a metal foil or a composite current collector. For example, an aluminum foil can be used as a metal foil. The composite current collector can include a polymer material base layer and a metal layer formed on at least one surface of the polymer material base layer. The composite current collector can be formed by forming a metal material on a polymer material substrate. The metal material includes but is not limited to an aluminum, an aluminum alloy, a copper, a copper alloy, a nickel, a nickel alloy, a titanium, a titanium alloy, a silver and silver alloy, etc. The polymer material substrate includes but is not limited to a polypropylene (PP), a polyethylene terephthalate (PET), a polybutylene terephthalate (PBT), a polystyrene (PS), a polyethylene (PE), etc.

In some embodiments, the cathode active material may include cathode active materials known in the art for use in the battery.

As an example, the cathode active material of a sodium-ion secondary battery can include at least one of the following materials: a sodium transition metal oxide, a sodium-containing polyanionic compound, and at least one of the Prussian blue compounds. However, the present application is not limited to these materials, and other traditionally known materials that can be used as cathode active materials for sodium-ion batteries can also be used.

As an optional technical solution for the present application, transition metals in sodium transition metal oxides include at least one of Mn, Fe, Ni, Co, Cr, Cu, Ti, Zn, V, Zr, Ca, Zr, Mg and Ce. An example of a sodium transition metal oxide is $Na_xMO_2$, where M includes one or more of Ti, V, Mn, Co, Ni, Fe, Cr, Zn, Ca, and Cu, where $0<x\leq 1$.

As an optional technical solution for the present application, the sodium-containing polyanionic compounds may be a class of compounds having sodium ions, transition metal ions and tetrahedral $(YO_4)^{n-}$ anionic units. The transition metals include at least one of Mn, Fe, Ni, Co, Cr, Cu, Ti, Zn, V, Zr and Ce; where Y includes at least one of P, S and Si; and n represents the valence state of $(YO_4)^{n-}$.

The sodium-containing polyanionic compounds can also be a class of compounds with sodium ions, transition metal ions, tetrahedral $(YO_4)^{n-}$ anionic units, and halogen anions. The transition metals include at least one of Mn, Fe, Ni, Co, Cr, Cu, Ti, Zn, V, Zr and Ce; where Y includes at least one of P, S and Si, and n represents the valence state of $(YO_4)^{n-}$; Halogens include at least one of F, Cl and Br.

The sodium-containing polyanionic compounds can also be a class of compounds with sodium ions, tetrahedral $(YO_4)^{n-}$ anionic units, polyhedral $(ZO_y)^{m+}$ units, and optionally halogen anions. Y includes at least one of P, S and Si, and n represents the valence state of $(YO_4)^{n-}$; Z represents a transition metal, including at least one of Mn, Fe, Ni, Co, Cr, Cu, Ti, Zn, V, Zr and Ce, and m represents the valence state of $(ZO_y)^{m+}$, and Halogens include at least one of F, Cl and Br.

The polyanionic compounds can be at least one such as $NaFePO_4$, $Na_3V_2(PO_4)_3$ (sodium vanadium phosphate, abbreviated as NVP), $Na_4Fe_3(PO_4)_2(P_2O_7)$, $NaM'PO_4F$ (where M' includes one or more of V, Fe, Mn and Ni), and $Na_3(VO_y)_2(PO_4)_2F_{3-2y}(0\leq y\leq 1)$.

The Prussian blue compounds can be a class of compounds with sodium ions, transition metal ions, and cyanogen ions ($CN^-$). The transition metals include at least one of Mn, Fe, Ni, Co, Cr, Cu, Ti, Zn, V, Zr and Ce. The Prussian blue compound is, for example, $Na_aMe_bMe'_c(CN)_6$, where Me and Me' independently include at least one of Ni, Cu, Fe, Mn, Co, and Zn, and where $0<a\leq 2$, $0<b<1$, and $0<c<1$.

In some preferred embodiments, the cathode active material is a Prussian blue compound, a sodium transition metal oxide, or a combination of the Prussian blue compound and the sodium transition metal oxide.

In some embodiments, the cathode film layer further includes a binder. As an example, the binder can include at least one of a polyvinylidene fluoride (PVDF), a polytetrafluoroethylene (PTFE), a vinylidene fluoride-tetrafluoroethylene-propylene terpolymer, a vinylidene fluoride-hexafluoropropylene terpolymer, a tetrafluoroethylene-hexafluoropropylene copolymer, and a fluorinated acrylic resin.

In some embodiments, the cathode film layer also includes a conductive agent. As an example, the conductive agent can include at least one of a superconducting carbon, an acetylene black, a carbon black, a Cochen black, carbon dots, carbon nanotubes, a graphene, and carbon nanofibers.

In some embodiments, the cathode sheet can be prepared by the following method: dispersing the above components (such as the cathode active material, the conductive agent, the binder and any other components) for preparing the cathode sheet in a solvent (such as, N-methylpyrrolidone) to form a cathode slurry, a solid content of the cathode slurry is arranged from 40 wt % to 80 wt %, and a viscosity of the cathode slurry is adjusted to 5000-25000 mPa s at a room temperature; coating the cathode slurry on the a surface of the cathode current collector, and performing a clod pressing by a cold rolling machine to form a cathode sheet after being dried. The coated surface density of the cathode film layer is ranged from 150 mg/m² to 450 mg/m², and the compaction density of the cathode sheet is ranged from 2.3 g/cm³ to 3.4 g/cm³, optionally, ranged from 2.8 g/cm³ to 3.2 g/cm³. The compaction density is calculated as following:

compaction density=coated surface density/(a thickness of the electrode sheet after being pressed—a thickness of the current collector).

Anode Sheet

The anode sheet includes an anode current collector and an anode film layer arranged on at least one surface of the anode current collector, and the anode film layer includes an anode active material.

As an example, the anode current collector has two surfaces opposite in the direction of its own thickness, and the anode film layer is arranged on either or both of the two surfaces of the anode current collector.

In some embodiments, the anode current collector can use a metal foil or a composite current collector. For example, an aluminum foil can be used as a metal foil. The composite current collector can include a polymer material base layer and a metal layer formed on at least one surface of the polymer material base layer. The composite current collector can be formed by forming a metal material on a polymer material substrate. The metal material includes but is not limited to an aluminum, an aluminum alloy, a copper, a copper alloy, a nickel, a nickel alloy, a titanium, a titanium alloy, a silver and silver alloy, etc. The polymer material substrate includes but is not limited to a polypropylene (PP), a polyethylene terephthalate (PET), a polybutylene terephthalate (PBT), a polystyrene (PS), a polyethylene (PE), etc.

In some embodiments, the anode active material can use anode active materials known in the art for use in the battery. As an example, the anode active material can include at least one of the following materials: a hard carbon, a soft carbon, an expanded graphite, a transition metal oxide, a transition metal sulfide, a transition metal phosphate, an alloy-like compound, a non-metallic element, etc. Optionally, the anode active material is the hard carbon, the soft carbon, or a combination of the hard carbon and the soft carbon. However, the present application is not limited to these materials, and other traditional materials that can be used as the anode active materials of the battery can also be used. These anode active materials can be used alone, or more than two can be used in combination.

In some embodiments, the anode film layer further includes a binder. The binder can be at least one selected from a styrene butadiene rubber (SBR), a styrene acrylic emulsion, a pure acrylic emulsion, a polyacrylic acid (PAA), a sodium polyacrylate (PAAS), a polyacrylamide (PAM), a polyvinyl alcohol (PVA), a polyacrylonitrile (PAN), a sodium alginate (SA), a polymethacrylic acid (PMAA), and a carboxymethyl chitosan (CMCS).

In some embodiments, the anode film layer further includes a conductive agent. The conductive agent can be at least one selected from a superconducting carbon, an acetylene black, a carbon black, a Cochen black, carbon dots, carbon nanotubes, a graphene, and carbon nanofibers.

In some embodiments, the anode film layer can optionally include other auxiliaries, such as thickeners (e.g., sodium carboxymethyl cellulose (CMC-Na)), and pore fillers (e.g., talc powder, aluminum oxide, etc.). The weight ratio of the other additives in the anode film layer is ranged from 0 to 15% by weight, based on the total weight of the anode film layer.

In some embodiments, the anode sheet can be prepared by the following method: dispersing the above components (such as the anode active material, the conductive agent, the binder and any other components) for preparing the anode sheet in a solvent (such as, deionized water) to form an anode slurry, a solid content of the anode slurry is arranged from 30 wt % to 70 wt %, and a viscosity of the anode slurry is adjusted to 2000-10000 mPa s at a room temperature; coating the anode slurry on the a surface of the anode current collector; then performing a drying process and a clod pressing (such as a roller), to obtain the anode sheet. The coated surface density of the anode film is ranged from 75 mg/m² to 220 mg/m².

The porosity P of the film layer can be obtained by gas displacement method, and the porosity $P=(V1-V2)/V1\times 100\%$, where V1 represents an apparent volume of the film layer, V2 represents a true volume of the film layer.

The test method of specific surface area BET of a substance or film can be referred to GB/T 19587-2004 gas adsorption BET method for the determination of specific surface area of solid substances.

The mass M of the active material per unit area of the film can be measured using a standard balance.

The thickness T of the film layer can be measured by a tenthousandth micrometer, for example, by a tenthousandth micrometer of model Mitutoyo293-100 with an accuracy of 0.1 m. It should be noted that the thickness of the film layer in the invention refers to the thickness of the film layer in the electrode sheets used for assembling the battery after being compacted by a cold pressing.

Electrolyte

The electrolyte is acted to conduct ions between the cathode sheet and the anode sheet.

In some embodiments, the electrolyte includes electrolyte salts and a solvent.

In some embodiments, the electrolyte salts of the sodium ion secondary battery can be selected from one or more of a sodium hexafluorophosphate ($NaPF_6$), a sodium difluorosulfonimide, a sodium trifluoromethane sulfonimide (NaTFSI), a sodium trifluoromethanesulfonate ($NaCF_3SO_3$), a sodium tetrafluoroborate, a sodium difluorophosphate, a sodium perchlorate ($NaClO_4$), and a sodium chloride. Optionally, the electrolyte salts may be selected from one or more of a sodium hexafluorophosphate ($NaPF_6$), a sodium perchlorate ($NaClO_4$), a sodium trifluoromethyl sulfonimide (NaTFSI), a sodium trifluoromethyl sulfonate ($NaCF_3SO_3$). Further, the electrolyte salt is the sodium hexafluorophosphate ($NaPF_6$). The concentration of the electrolyte salt is usually ranged from 0.5 mol/L to 5 mol/L.

In some embodiments, the solvent is one or more of a cyclic ester, a linear ester, a cyclic ether, a linear ether organic solvent. For example, the solvent can be one or more selected from a vinyl fluorocarbonate (FEC), an ethyl carbonate (EC), a propylidene carbonate (PC), a methyl ethyl carbonate (EMC), a diethyl carbonate (DEC), a dimethyl carbonate (DMC), a dimethyl ether (DME), a diethylene glycol dimethyl ether (DEGDME), a tetraethylene glycol dimethyl ether (TEGDME), a tetrahydrofuran (THF), a dipropyl carbonate (DPC), a methylpropyl carbonate (MPC), an ethylpropyl carbonate (EPC), a butylene carbonate (BC), a methyl formate (MF), a methyl acetate (MA), an ethyl acetate (EA), a Propyl acetate (PA), a methyl propionate (MP), an ethyl propionate (EP), a Propyl propionate (PP), a methyl butyrate (MB), an Ethyl butyrate (EB), 1, 4-butyrolactone (GBL), a sulfolane (SF), a dimethyl sulfone (MSM), a methyl ethyl sulfone (EMS), and a diethyl sulfone (ESE).

In some embodiments, the electrolyte can also optionally include additives. For example, the additives can include anode film forming additives, cathode film forming additives, and can also include additives that can improve certain properties of the battery, such as additives to improve the overcharge performance of the battery, additives to improve the high or low temperature performance of the battery, additives to improve gas production, and additives to improve the cycle film formation.

Isolation Film

In some embodiments, the secondary battery further includes an isolation film. There is no special limitation on the type of isolation film in the present application, and any well-known porous structure isolation film with good chemical stability and mechanical stability can be selected.

In some embodiments, the material of the isolation film can be selected from at least one of a glass fiber, a non-woven fabric, a polyethylene, a polypropylene, and a polyvinylidene fluoride. The isolation film can be a single layer film or a multi-layer composite film, which is not specially limited. When the isolation film is a multi-layer composite film, the material of each layer can be the same or different without special limitations.

In some embodiments, a thickness of the isolation film is ranged from 5 m to 20 m, optionally ranged from 5 m to 15 m.

In some embodiments, the cathode sheet, the anode sheet, and the isolation film can be fabricated into an electrode assembly by a winding process or a lamination process.

In some embodiments, the secondary battery can include an outer package. The outer package can be used to encapsulate the electrode assembly and electrolyte.

In some embodiments, the outer package of the secondary battery can be a hard shell, such as a hard plastic shell, an aluminum shell, a steel shell, etc. The outer package of the secondary battery can also be a soft package, such as a bag-type soft package. The material of the soft package can be a plastic, such as, a polypropylene, a polybutylene terephthalate and a polybutylene succinate, etc.

There is no special limitation on the shape of the secondary battery, which may be a cylindrical, a square or any other arbitrary shape. For example, FIG. 1 is used as an example of the square structure of a secondary battery 5.

Figure 2:
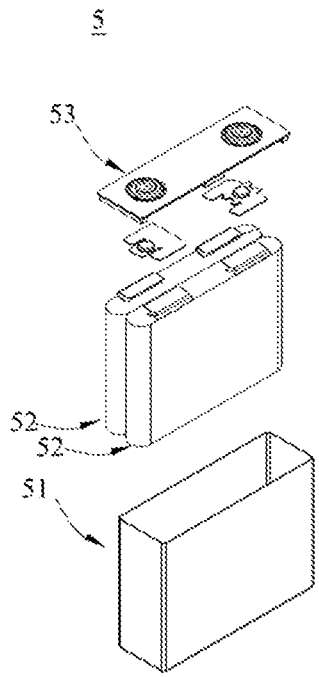
FIG. 2 is an explosive view of the secondary battery of the embodiment of the present application shown in FIG. 1.

In some embodiments, as shown in FIG. 2, the outer package can include a shell 51 and a cover plate 53. The shell 51 can include a bottom plate and side plates connected to the bottom plate, and the bottom plate and the side plates are enclosed to form an accommodating cavity. The shell 51 is provided with an opening communicated with the accommodating cavity, and the cover plate 53 can be covered with the opening to close the accommodating cavity. The cathode sheet, the anode sheet and the isolation film can be formed into an electrode assembly by a winding process or a lamination process. The electrode assembly 52 is enclosed in the accommodating cavity. The electrolyte is infiltrated in the electrode assembly 52. The number of electrode assemblies 52 contained in the secondary battery 5 can be one or more, and those skilled in the art can select according to the actual needs.

In some embodiments, the secondary battery may be assembled into a battery module, the number of secondary batteries contained in the battery module can be one or more, and the specific number may be selected by those skilled in the art according to the application and capacity of the battery module.

In a battery module, a plurality of secondary batteries 5 can be arranged in sequence along the length direction of the battery module. Further, it can be arranged any other way. The plurality of secondary batteries 5 can be further fixed by fasteners.

Optionally, the battery module can also include a shell with an accommodating space in which a plurality of secondary batteries 5 are accommodated.

In some embodiments, the battery module may also be assembled into a battery pack, which may contain one or more battery modules, the specific number of which may be selected by those skilled in the art according to the application and capacity of the battery pack.

The battery pack can include a battery box and a plurality of battery modules arranged in the battery box. The battery box includes an upper box and a lower box. The upper box can be covered with the lower box and form a closed space for accommodating the battery modules. The plurality of battery modules can be arranged in the battery box in any way.

In addition, the present application provides an electrical device including at least one of the secondary battery, the battery module, and the battery pack provided in the present application. The secondary battery, the battery module, or the battery pack can be used as a power source of the electrical device, and can also be used as an energy storage unit of the electrical device. The electric device can include a mobile device (such as a mobile phone, a laptop, etc.), an electric vehicle (such as a pure electric vehicle, a hybrid electric vehicle, a plug-in hybrid electric vehicle, an electric bicycle, an electric scooters, an electric golf cart, an electric truck, etc.), an electric train, a ship and a satellite, an energy storage system, etc., which is not limited to this.

As the electrical device, the secondary battery, the battery module or the battery pack can be selected according to the actual needs.

Figure 3:
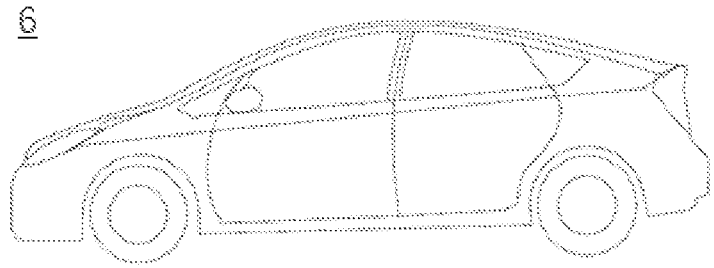
FIG. 3 is a schematic diagram of an electrical device for which a secondary battery is used as a power source in an embodiment of the present application.

FIG. 3 is an example of the electrical device. The electric device is a pure electric vehicle, a hybrid electric vehicle, or a plug-in hybrid electric vehicle, etc. In order to meet the high power and high energy density requirements of the secondary battery of the electrical device, the battery pack or the battery module can be used.

As another example, the electrical device can be a mobile phone, a tablet, a laptop, etc. The device is usually required to be thin and light, and can use the secondary battery as a power source.

Examples

In order to make the technical problems, technical solutions and beneficial effects solved by the present application clearer, the present application will be further explained in detail in combination with examples and attached drawings. It is clear that the embodiments described are only a portion of the examples of the present application and not the entirety of the examples. The following description of at least one exemplary embodiment is in fact illustrative only and in no way constitutes any limitation on the present application and its application. Based on the examples in the present application, all other examples acquired by those skilled in the art without creative labor fall within the scope of protection in the present application.

Where no specific technology or condition is indicated in the example, it shall be carried out in accordance with the technology or condition described in the literature in the field or in accordance with the product specification. The reagents or instruments used, where the manufacturer is not indicated, are conventional products that can be obtained through market purchase.

Examples

Example 1

1) Preparation of the Cathode Sheet
(1) A cathode active material with $D_{n10}$ of 0.4 m is provided;
The cathode material is selected from the commercially available layered excessive metal oxide material $Na_{0.9}Ni_{0.3}Fe_{0.3}Mn_{0.3}O_2$, where $D_{n10}$ is 0.4 µm; $D_{v10}$ is 2.5 µm, $D_{v50}$ is 5.2 µm, and $D_{v90}$ is 8.7 µm.
(2) The cathode active material CG-1 of step (1), the conductive carbon black SP and the binder PVDF are dispersed into the solvent NMP according to the weight ratio of 96:2.5:1.5 and mixed evenly to obtain a cathode slurry with a solid content of 65%; the cathode slurry is evenly coated on the cathode current collector aluminum foil, then dried at a temperature of 110° C., and then cold pressed by a cold pressing machine under 40 T pressure to obtain a single coated cathode sheet with a cathode film layer with a thickness of 105 m, and the single-side coated weight per unit area is 0.35 g/1540.25 mm². The compaction density of the cathode film layer is 2.8 g/cm³.

2) Preparation of the Anode Sheet
(1) an anode active material with $D_{n10}$ of 0.8 m is provided;
The anode active material was selected from commercially available hard carbon, where $D_{n10}$ is 0.8 µm; $D_{v10}$ is 2.5 m, $D_{v50}$ is 5.0 m, and $D_{v90}$ is 9.9 m.
(2) The anode active material hard carbon prepared in step (1), the adhesive (styrene butadiene rubber (SBR)), the conductive agent (superconducting carbon black (SP)) and the thickener (sodium carboxymethyl cellulose (CMC)) are mixed according to the mass ratio of 96:2.5:0.5:1, then the deionized water is added, and then the anode slurry with 45% solid content is obtained under the action of vacuum mixer; the anode slurry is evenly coated on the copper foil; after airing at room temperature, the copper foil is transferred to the oven for drying at 110° C. for 1 h, and then cold pressed by a cold pressing machine under 40 tons (T) pressure to obtain a single coated anode sheet with an anode film layer with a thickness of 113 m after being cut, and the single-side coated weight per unit area is 0.168 g/1540.25 mm². The compaction density of the anode film layer is 0.95 g/cm³.

3) Isolation Film
Polypropylene isolation film with a thickness of 12 m is selected (provided by Celgard).

4) Preparation of the Electrolyte
The organic solvent is a mixture of an ethylene carbonate (EC), a methyl ethyl carbonate (EMC) and a propylene carbonate (PC), where the volume ratio of EC, EMC and DEC is 20:30:50. In the argon atmosphere glove box with water content <10 ppm, fully dried sodium salt $NaPF_6$ is dissolved in the organic solvent and mixed evenly to obtain the electrolyte. The concentration of the sodium salt is 1 mol/L.

5) Preparation of the Battery
The cathode sheet, the isolation film and the anode sheet are stacked in order, the isolation film located between the cathode sheet and the anode sheet plays an isolating role between the cathode sheet and the anode sheet, and then the stacked structure is wound to form a square bare cell, and then the square bare cell is placed into an aluminum-plastic film; and after the water is removed by baking at 105° C., 24 g of the corresponding non-hydrolysis solution is injected and then sealed; and a finished battery with a capacity of 4000 mAh is obtained after standing, hot and cold pressing, formation, fixture, and capacity separation and other processes.

Examples 2-8

Repeating the method of preparing the secondary battery of the Example 1, the difference is that the $D_{n10}$ of the cathode active material and the anode active material are changed, as shown in Table 1.

Examples 9-12

Repeating the method of preparing the secondary battery of the Example 2, the difference is that: 1) the cold pressures are respectively replaced by 45 T, 35 T, 28 T and 62 T in step 2 during preparing the cathode sheet; and the relevant parameters of other products are shown in Table 1.

Examples 13-15

Repeating the method of preparing the secondary battery of the Example 2, the difference is that: 2) the cold pressures are respectively replaced by 58 T, 28 T and 12 T in step 2 during preparing the anode sheet; and the relevant parameters of other products are shown in Table 1.

Examples 16

Repeating the method of preparing the secondary battery of the Example 1, the difference is that: $D_{n10}$ of the active substance is changed (see Table 1); the formulation ratio of the anode film layer is changed to 91.6:4.8:1.6:2, and the anode single-side coated weight per unit area is 0.168 g/1540.25 mm², and the compaction density is 0.98 g/cm³.

Example 17

Repeating the method of preparing the secondary battery of the Example 1, the difference is that: $D_{n10}$ of the active substance is changed (see Table 1); the ratio of the anode film layer of material composition of the anode active material (hard carbon), the pore filling agent (inactive graphite), the conductive agent (superconducting carbon black), the binder (styrene butane-rubber), and the thickener (sodium carboxymethyl cellulose) is 90:6:0.5:5:1, the cold compaction density is 1.1 g/cm³, and the single-side coated mass is 0.17 g/1540.25 mm².

Comparison Examples 1-2

Repeating the method of preparing the secondary battery of the Example 1, the difference is that: the corresponding cathode and anode materials are replaced with different active substances of $D_{n10}$; and the $D_{v10}$, $D_{v50}$ and $D_{v90}$ remain unchanged.

Comparison Examples 3-4

Repeating the method of preparing the secondary battery of the Example 1, the difference is that: the cold pressures of the cathode and anode sheets are adjusted.

0.33C (that is, the current value of the theoretical capacity is completely discharged within 3 hours) until the voltage is 2.0V. then the charging at a constant current is carried out at a charging current of 0.33C to a voltage of 4.0V, and continue to charge at a constant voltage to a current of 0.05C, at which time the battery is fully charged. After standing the fully charged battery for 5 minutes, the battery is discharged at a constant current to 2.0V at a discharging current of 0.33C, where the current discharge capacity is the

TABLE 1

Product parameters for examples and comparison examples of cathode and anodes

| No. | cathode active material A1 ($D_{n10}$) μm | $D_{v50}$ μm | anode active material A2 ($D_{n10}$) μm | $D_{v50}$ μm | cathode film layer Porosity (B1) % | compaction density g/cm3 | anode film layer Porosity (B2) % | compaction density g/cm3 | 3 × (A1/A2) × (B2 − B1)/ (B1 + B2) |
|---|---|---|---|---|---|---|---|---|---|
| Example 1 | 0.4 | 5.2 | 0.8 | 5.0 | 25 | 2.8 | 50 | 0.95 | 0.5 |
| Example 2 | 0.6 | 5.2 | 0.8 | 5.0 | 25 | 2.8 | 50 | 0.95 | 0.750 |
| Example 3 | 0.8 | 5.3 | 0.8 | 5.0 | 25 | 2.8 | 50 | 0.95 | 1.000 |
| Example 4 | 0.25 | 5.2 | 0.8 | 5.0 | 25 | 2.8 | 50 | 0.95 | 0.313 |
| Example 5 | 1.2 | 5.4 | 0.8 | 5.0 | 25 | 2.8 | 50 | 0.95 | 1.500 |
| Example 6 | 0.6 | 5.2 | 0.4 | 5.0 | 25 | 2.8 | 50 | 0.95 | 1.500 |
| Example 7 | 0.6 | 5.2 | 0.5 | 5.0 | 25 | 2.8 | 50 | 0.95 | 1.200 |
| Example 8 | 0.6 | 5.2 | 2.6 | 5.6 | 25 | 2.8 | 50 | 0.95 | 0.231 |
| Example 9 | 0.6 | 5.2 | 0.8 | 5.0 | 20 | 2.88 | 50 | 0.95 | 0.964 |
| Example 10 | 0.6 | 5.2 | 0.8 | 5.0 | 30 | 2.7 | 50 | 0.95 | 0.563 |
| Example 11 | 0.6 | 5.2 | 0.8 | 5.0 | 35 | 2.59 | 50 | 0.95 | 0.397 |
| Example 12 | 0.6 | 5.2 | 1.2 | 5.0 | 10 | 3.15 | 50 | 0.95 | 1.000 |
| Example 13 | 0.6 | 5.2 | 0.8 | 5.0 | 25 | 2.8 | 40 | 0.98 | 0.519 |
| Example 14 | 0.6 | 5.2 | 0.8 | 5.0 | 25 | 2.8 | 55 | 0.93 | 0.844 |
| Example 15 | 0.6 | 5.2 | 0.8 | 5.0 | 25 | 2.8 | 60 | 0.91 | 0.926 |
| Example 16 | 0.8 | 5.3 | 2.6 | 5.6 | 25 | 2.8 | 50 | 0.95 | 0.308 |
| Example 17 | 0.6 | 5.2 | 0.8 | 5.1 | 25 | 2.8 | 40 | 0.98 | 0.5 |
| Comparison example 1 | 1.5 | 5.4 | 0.8 | 5.0 | 25 | 2.8 | 50 | 0.95 | 1.607 |
| Comparison example 2 | 0.8 | 5.3 | 0.2 | 5.0 | 25 | 2.8 | 50 | 0.95 | 4.000 |
| Comparison example 3 | 0.8 | 5.3 | 0.8 | 5.0 | 9 | 3.2 | 50 | 0.95 | 2.084 |
| Comparison example 4 | 0.8 | 5.3 | 0.8 | 5.0 | 25 | 2.8 | 62 | 0.9 | 1.276 |

Battery Performance Test
1. Compaction Density Test:

The compaction density Pa of the cathode and anode film layers can be calculated by the formula Pa=ma/Va. Where, ma is the mass of the cathode and anode film layers, unit: g; Va is the volume of the cathode and anode film layers, unit: cm³, where volume Va is the product of the area Sa of the cathode and anode film layer and the thickness of the cathode and anode film layers.

2. Cyclic Performance Test:

The sodium-ion battery is charged at 0.33C constant current to 4.0V and charged at 4.0V constant voltage to 0.05C under a test temperature of 25° C., and then is discharged at 0.5C constant current to 2.0V after standing for 5 min; which is a cycle. The capacity of the sodium-ion battery is recorded as the initial capacity, and then multiple cycles are performed to obtain capacity retention and capacity decay curves by comparing the capacity obtained from each cycle with the initial capacity. The number of cycles with capacity retention rate attenuation of 80% is recorded as the number of cycles of sodium-ion batteries at 25° C.

3. Fast Charging Performance Test: Which is Expressed by the Rate at which Sodium Evolution Occurs after Charging;

The charging and discharging test is carried out at a constant temperature of 25° C., and the discharging at a constant current is carried out at a discharging current of actual capacity of the battery at 0.33C, which is recorded as C0 mAh. The battery is then charged at a constant current to 4.0V at the constant current density of xC0, then the battery is charged at a constant voltage to a current of 0.05C0, then the battery is disassembled after standing for 5 min to observe the sodium evolution at the interface, then rate of charging is adjusted until sodium evolution occurs, where the current rate X is the rate of sodium evolution.

Test Results for Examples and Comparison Examples

The batteries prepared in examples and comparison examples respectively according to the above method, and various performance parameters are measured, the results are shown in Table 2 below.

TABLE 2

The relative performances of the batteries of examples and comparison examples

| No. | Number of cycles | Rate of sodium evolution |
|---|---|---|
| Example 1 | 2200 | 1.8 |
| Example 2 | 2380 | 1.9 |
| Example 3 | 2300 | 1.9 |
| Example 4 | 2160 | 2.1 |
| Example 5 | 2080 | 1.8 |

TABLE 2-continued

The relative performances of the batteries of examples and comparison examples

| No. | Number of cycles | Rate of sodium evolution |
|---|---|---|
| Example 6 | 2090 | 2.2 |
| Example 7 | 2140 | 2.1 |
| Example 8 | 2090 | 1.8 |
| Example 9 | 2160 | 1.9 |
| Example 10 | 2240 | 1.9 |
| Example 11 | 2190 | 1.9 |
| Example 12 | 2130 | 1.9 |
| Example 13 | 2150 | 1.6 |
| Example 14 | 2330 | 2.1 |
| Example 15 | 2180 | 2.2 |
| Example 16 | 2100 | 1.9 |
| Example 17 | 2180 | 1.6 |
| Comparison example 1 | 1890 | 1.3 |
| Comparison example 2 | 1860 | 1.3 |
| Comparison example 3 | 1780 | 1.1 |
| Comparison example 4 | 1760 | 1.4 |

According to the above examples and comparison examples, with the increase of $D_{n10}$ of the cathode active material or the anode active material, and with the increase of the porosity of the cathode film layer and anode film layer, the corresponding rate of sodium evolution of the secondary battery increases, for example, it can reach more than 2 rates. As the value of the relation $3\times(A1/A2)\times(B2-B1)/(B1+B2)$ increases, the cycle performance of the corresponding batteries first increases and then decreases, for example, the number of cycles whose capacity retention rate decays to 80% can reach more than 2300 times. In summary, the secondary battery of the present application has both good cycle life and excellent fast charging ability.

It should be noted that the present application is not limited to the above embodiments. The above embodiments are only examples, and embodiments that have essentially the same composition as the technical idea and play the same role and effect within the scope of the technical scheme of the present application are included in the technical scope of the present application.

What is claimed is:

1. A secondary battery, comprising:
a cathode sheet, comprising a cathode film layer containing a cathode active material;
an anode sheet, comprising an anode film layer containing an anode active material; and
an electrolyte;
wherein the secondary battery meets a following function relationship:

$$0.22\leq 3\times(A1/A2)\times(B2-B1)/(B1+B2)\leq 1.55;$$

wherein A1 is a particle size $D_{n10}$ of the cathode active material corresponding to that a cumulative percentage of a particle number sequentially counted from a small particle in the cathode active material reaches 10% of a total particle number, in m;
A2 is a particle size $D_{n10}$ of the anode active material corresponding to that a cumulative percentage of a particle number sequentially counted from a small particle in the anode active material reaches 10% of the total particle number, in m;
B1 is a porosity of the cathode film layer; and
B2 is a porosity of the anode film layer.

2. The secondary battery according to claim 1, wherein 0.25 μm≤A1≤1.2 μm, and 0.4 μm≤A2≤3.0 μm.

3. The secondary battery according to claim 1, wherein 10%≤B2−B1≤40%.

4. The secondary battery according to claim 1, wherein an average volume particle size $D_{v50}$ of the cathode active material is ranged from 4.2 μm to 9.7 μm.

5. The secondary battery according to claim 1, wherein an average volume particle size $D_{v50}$ of the anode active material is ranged from 3.4 μm to 9.6 μm.

6. The secondary battery according to claim 1, wherein the cathode active material meets at least one of following characteristics:
$D_{v10}$ is ranged from 2.2 μm to 4.9 μm; and
$D_{v90}$ is ranged from 8.2 μm to 21.9 μm.

7. The secondary battery according to claim 1, wherein the anode active material meets at least one of following characteristics:
$D_{v10}$ is ranged from 1.9 μm to 3.4 μm; and
$D_{v90}$ is ranged from 7.9 μm to 17.5 μm.

8. The secondary battery according to claim 1, wherein a compaction density of the cathode film layer is arranged from 2.3 g/cm³ to 3.2 g/cm³, and a thickness of the cathode film is arranged from 60 μm to 110 μm.

9. The secondary battery according to claim 1, wherein a compaction density of the anode film layer is arranged from 0.9 g/cm³ to 1.2 g/cm³, and a thickness of the anode film layer is arranged from 50 μm to 140 μm.

10. The secondary battery according to claim 1, wherein the cathode film layer comprises the cathode active material of 90-97%, a conductive agent of 0.8-2.0%, and a binder of 1.5-2.7%, based on a weight of the cathode film layer.

11. The secondary battery according to claim 1, wherein the anode film layer comprises the anode active material of 91.6-97.5%, a conductive agent of 0-1.74%, and a binder of 0-6.56%, based on a weight of the anode film layer.

12. The secondary battery according to claim 1, wherein the secondary battery is a sodium-ion secondary battery.

13. An electrical device, comprising a secondary battery comprising:
a cathode sheet, comprising a cathode film layer containing a cathode active material;
an anode sheet, comprising an anode film layer containing an anode active material; and
an electrolyte;
wherein the secondary battery meets a following function relationship:

$$0.22\leq 3\times(A1/A2)\times(B2-B1)/(B1+B2)\leq 1.55;$$

wherein A1 is a particle size $D_{n10}$ of the cathode active material corresponding to that a cumulative percentage of a particle number sequentially counted from a small particle in the cathode active material reaches 10% of a total particle number, in m;
A2 is a particle size $D_{n10}$ of the anode active material corresponding to that a cumulative percentage of a particle number sequentially counted from a small particle in the anode active material reaches 10% of the total particle number, in m;
B1 is a porosity of the cathode film layer; and
B2 is a porosity of the anode film layer.

* * * * *